United States Patent
Ritzer et al.

(10) Patent No.: US 11,579,620 B2
(45) Date of Patent: Feb. 14, 2023

(54) METHOD FOR DOCKING AN AUTONOMOUS MOBILE GREEN AREA MAINTENANCE ROBOT TO A DOCKING STATION, DOCKING STATION SYSTEM, GREEN AREA MAINTENANCE SYSTEM, AND SYSTEM

(71) Applicant: Andreas Stihl AG & Co. KG, Waiblingen (DE)

(72) Inventors: Peter Ritzer, Ebbs (AT); Samuel Zoettl, Innsbruck (AT); Christian Horngacher, Kirchberg (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 358 days.

(21) Appl. No.: 16/899,688

(22) Filed: Jun. 12, 2020

(65) Prior Publication Data
US 2020/0393844 A1   Dec. 17, 2020

(30) Foreign Application Priority Data
Jun. 14, 2019  (EP) .................... 19180275

(51) Int. Cl.
| | |
|---|---|
| G05D 1/02 | (2020.01) |
| B60L 53/36 | (2019.01) |
| B60L 53/39 | (2019.01) |
| A01D 34/00 | (2006.01) |
| H02J 7/00 | (2006.01) |
| A01D 101/00 | (2006.01) |

(52) U.S. Cl.
CPC ......... *G05D 1/0225* (2013.01); *A01D 34/008* (2013.01); *B60L 53/36* (2019.02); *B60L 53/39* (2019.02); *H02J 7/0045* (2013.01); *A01D 2101/00* (2013.01); *B60L 2200/40* (2013.01); *G05D 2201/0208* (2013.01)

(58) Field of Classification Search
CPC ....... G05D 1/0225; B60L 53/36; B60L 53/39; A01D 34/008
See application file for complete search history.

(56) References Cited

U.S. PATENT DOCUMENTS

| | | |
|---|---|---|
| 9,876,370 B2 | 1/2018 | Yamamura et al. |
| 2015/0032320 A1 | 1/2015 | Bernini |
| (Continued) | | |

FOREIGN PATENT DOCUMENTS

| | | |
|---|---|---|
| EP | 2 717 110 A1 | 4/2014 |
| EP | 2 829 937 A1 | 1/2015 |

*Primary Examiner* — Richard V Muralidar
(74) *Attorney, Agent, or Firm* — Crowell & Moring LLP

(57) ABSTRACT

A method docks an autonomous mobile green area maintenance robot to a docking station. An electrical conductor arrangement runs in the region of the docking station, wherein the conductor arrangement is designed such that a periodic current flows through the conductor arrangement, wherein the current generates a periodic magnetic field. The green area maintenance robot has two magnetic field sensors, wherein the two magnetic field sensors are designed such that the magnetic field respectively causes a periodic sensor signal in the magnetic field sensors. The method has the steps of: determining a phase shift between the two sensor signals or signals based on the sensor signals, and controlling movement of the green area maintenance robot for docking on the basis of the determined phase shift.

15 Claims, 3 Drawing Sheets

(56) References Cited

U.S. PATENT DOCUMENTS

2016/0285288 A1* 9/2016 Yamamura .............. B60L 53/14
2017/0322562 A1* 11/2017 Churavy .............. G05D 1/0265
2020/0073403 A1* 3/2020 Abramson ........... G05D 1/0265

* cited by examiner

METHOD FOR DOCKING AN AUTONOMOUS MOBILE GREEN AREA MAINTENANCE ROBOT TO A DOCKING STATION, DOCKING STATION SYSTEM, GREEN AREA MAINTENANCE SYSTEM, AND SYSTEM

FIELD OF APPLICATION AND PRIOR ART

The invention relates to a method for docking an autonomous mobile green area maintenance robot to a docking station, to a docking station system having a docking station, and to a green area maintenance system having an autonomous mobile green area maintenance robot, and to a system having such a green area maintenance system and a docking station system, in particular such a docking station system.

OBJECT AND ACHIEVEMENT

The invention is based on the object of providing a method for docking an autonomous mobile green area maintenance robot to a docking station, which method has improved properties. The invention is also based on the object of providing a docking station system having a docking station, a green area maintenance system having an autonomous mobile green area maintenance robot and a system having such a green area maintenance system and a docking station system, in particular such a docking station system.

The invention achieves this object by providing a method, a docking station system, a green area maintenance system, and a system, according to the claimed invention.

The method according to the invention is designed or configured to dock an autonomous mobile green area maintenance robot to a docking station, in particular in an automatic manner. An electrical conductor arrangement runs in the region of the docking station. The conductor arrangement is designed or configured such that a periodic current, in particular an electrical and/or temporally periodic current, flows through the conductor arrangement. The current generates or causes a periodic magnetic field, in particular a temporally periodic magnetic field. The green area maintenance robot has two magnetic field sensors, in particular electrical magnetic field sensors. The two magnetic field sensors are designed or configured such that the magnetic field respectively causes or generates a periodic sensor signal, in particular an electrical and/or temporally periodic sensor signal, in the magnetic field sensors. The method has the steps of: a) determining, in particular automatically determining, a phase shift or a phase offset or a phase difference between the two sensor signals or signals based on the sensor signals; b) controlling, in particular automatically controlling, in particular regulating, movement of the green area maintenance robot for docking on the basis of the determined phase shift, in particular a determined or predefined phase shift, or in such a manner that the phase shift reaches or assumes a determined or predefined value, in particular with and/or after step a) in terms of time.

The phase shift between the two sensor signals may be influenced to a lesser extent or may even not be influenced by possible external interference of the magnetic field and/or internal deviations caused by component and manufacturing tolerances between the magnetic field sensors, in particular in contrast to amplitudes or strengths of the sensor signals. This therefore makes it possible for the docking to be robust. This therefore makes it possible for the docking to be carried out without previous calibration of the docking in terms of time, in particular in contrast to docking on the basis of amplitudes, in particular a difference in the amplitudes, of the sensor signals. This therefore makes it possible for the docking to be carried out at a plurality of docking stations, in particular without different calibration processes for the plurality of docking stations, if actually possible.

In particular, the docking station may be designed to dock the green area maintenance robot. Additionally or alternatively, the green area maintenance robot may be designed to dock to the docking station.

Autonomous may mean that the green area maintenance robot can move independently, automatically, in a self-determined manner, in a self-directed manner, in a self-guided manner and/or independently of a user.

The green area maintenance robot may be designed as a robotic lawn mower.

The conductor arrangement can be laid under or in a plate, in particular a baseplate and/or a travel plate. Additionally or alternatively, the conductor arrangement may be a loop, in particular a closed loop, in particular a wire loop.

The current may have a sinusoidal oscillation. Additionally or alternatively, the current does not need to flow continuously. In particular, the current can flow in the form of periodic signal bursts with pauses between the signal bursts. In particular, a duration of the flow of a respective one of the signal bursts may correspond, in particular be equal, to a duration of a respective one of the pauses. Additionally or alternatively, the duration of the flow of a respective one of the signal bursts may be at least 100 milliseconds (ms) and/or at most 1000 ms and/or the duration of a respective one of the pauses may be at least 100 ms and/or at most 1000 ms. Further additionally or alternatively, a periodicity between a respective one of the signal bursts and a respective one of the pauses may be fixed.

The two magnetic field sensors may each be designed to capture and convert the magnetic field into the sensor signal. Additionally or alternatively, the two magnetic field sensors may have a total sensor spacing from one another. Further additionally or alternatively, the green area maintenance robot may have at least three magnetic field sensors. In particular, a third magnetic field sensor having a coupling factor which is greater than the two magnetic field sensors can make it possible to improve reception over large areas. Further additionally or alternatively, the two magnetic field sensors can each have a capture direction. In particular, the capture directions may be parallel to one another. Additionally or alternatively, the two magnetic field sensors may be designed or configured, in particular aligned, such that only a component of the magnetic field that is parallel to the capture direction can respectively cause, in particular causes, the sensor signal in the magnetic field sensors. Further additionally or alternatively, the two magnetic field sensors may each be designed to capture only that component of the magnetic field which is parallel to the capture direction.

In one development of the invention, step b) comprises: carrying out control, in particular regulation, in such a manner that the phase shift is in the range between 0 and $\pi$, in particular $\pi/2$. This makes it possible for the green area maintenance robot to follow the conductor arrangement.

In one development of the invention, the docking station has a station docking axis, in particular a horizontal station docking axis, in particular a station central axis. At least one conductor section of the conductor arrangement runs approximately parallel to the station docking axis. This makes it possible for the green area maintenance robot to move to the docking station, in particular a center of the docking station or centrally. In particular, approximately parallel may mean that the conductor section may have an angle of at most 5 degrees (°), in particular at most 2°, in particular at most 1°, with respect to the station docking axis. In particular, the conductor section can run parallel to the station docking axis.

In one configuration of the invention, the green area maintenance robot has a robot docking axis, in particular a horizontal robot docking axis, in particular a robot central axis or robot longitudinal axis. Step b) comprises: carrying out control in such a manner that the green area maintenance robot moves to the docking station with its robot docking axis aligned approximately coaxially with the station docking axis. This makes it possible for the green area maintenance robot to be suitably aligned with the docking station. In particular, approximately coaxially may mean that the robot docking axis may have an angle of at most 5°, in particular at most 2°, in particular at most 1°, with respect to the station docking axis. In particular, the robot docking axis may be coaxial with respect to the station docking axis.

In one configuration of the invention, the green area maintenance robot has a movement plane, in particular a horizontal movement plane, in particular a travel plane. The two magnetic field sensors each have a capture direction, in particular a vertical capture direction, approximately orthogonal to the movement plane. Furthermore, the two magnetic field sensors are designed or configured, in particular aligned, such that only a component, in particular a vertical component, of the magnetic field that is parallel to the capture direction respectively causes the sensor signal in the magnetic field sensors. Step b) comprises: carrying out control in such a manner that one of the two magnetic field sensors is positioned above the at least one conductor section in the capture direction and another of the two magnetic field sensors is not positioned above the at least one conductor section in the capture direction. In particular, this may have been or may be enabled by carrying out control in such a manner that the phase shift may be in the range between 0 and $\pi$, in particular $\pi/2$. In particular, the travel plane may be defined by travel wheels of the green area robot. Further additionally or alternatively, approximately orthogonal may mean that the capture direction may have an angle of at least 85°, in particular at least 88°, in particular at least 89°, with respect to the movement plane. In particular, the capture direction may be orthogonal to the movement plane. Further additionally or alternatively, the capture directions may be parallel to one another. Further additionally or alternatively, the two magnetic field sensors may each be designed to capture only that component of the magnetic field which is parallel to the capture direction. Further additionally or alternatively, the conductor section may run approximately parallel to the movement plane.

In one configuration of the invention, the conductor arrangement has at least two conductor sections. The two conductor sections each run approximately parallel to the station docking axis, in particular approximately parallel to the movement plane. Furthermore, the two conductor sections have a total conductor spacing from one another in a conductor spacing direction orthogonal to the station docking axis, in particular a horizontal conductor spacing direction and/or a conductor spacing direction parallel to the movement plane. The two magnetic field sensors have a total sensor spacing from one another in a sensor spacing direction orthogonal to the robot docking axis, in particular a horizontal sensor spacing direction and/or a sensor spacing direction parallel to the movement plane. The total conductor spacing, in particular a value of the total conductor spacing, differs from, in particular is greater than, the total sensor spacing, in particular a value of the total sensor spacing. In particular, this may enable control in such a manner that the phase shift can be in the range between 0 and $\pi$, in particular $\pi/2$. Additionally or alternatively, this may enable control in such a manner that the one magnetic field sensor may be positioned above the one conductor section in the capture direction and the other magnetic field sensor cannot be positioned above the other conductor section in the capture direction. In particular, the other magnetic field sensor may be or may have been positioned closer to the other conductor section than the one conductor section. Additionally or alternatively, the one magnetic field sensor may be designed or positioned such that only that component of the magnetic field of the one conductor section which is parallel to the capture direction can cause the sensor signal in the one magnetic field sensor, and the other magnetic field sensor may be designed or positioned such that only that component of the magnetic field of the other conductor section which is parallel to the capture direction can cause the sensor signal in the other magnetic field sensor. Further additionally or alternatively, the two magnetic field sensors may have identical spacings from a front side or front of the green area maintenance robot along the robot docking axis. Further additionally or alternatively, the conductor spacing direction and the sensor spacing direction may be parallel.

In one configuration of the invention, the conductor arrangement has at least two conductor sections. The two conductor sections each run approximately parallel to the station docking axis, in particular approximately parallel to the movement plane. Furthermore, the two conductor sections have different conductor spacings, in particular different values of the conductor spacings, from the station docking axis, in particular the station central axis, in a conductor spacing direction orthogonal to the station docking axis, in particular a horizontal conductor spacing direction and/or a conductor spacing direction parallel to the movement plane.

Additionally or alternatively, the two magnetic field sensors have identical sensor spacings, in particular identical values of the sensor spacings, from the robot docking axis, in particular the robot central axis, in a sensor spacing direction orthogonal to the robot docking axis, in particular a horizontal sensor spacing direction and/or a sensor spacing direction parallel to the movement plane.

In particular, this can enable control in such a manner that the phase shift may be in the range between 0 and $\pi$, in particular $\pi/2$. Additionally or alternatively, this may enable control in such a manner that the one magnetic field sensor can be positioned above the one conductor section in the capture direction and the other magnetic field sensor cannot be positioned above the other conductor section in the capture direction. In particular, the other magnetic field sensor may be or may have been positioned closer to the other conductor section than the one conductor section. Additionally or alternatively, the one magnetic field sensor may be designed or positioned such that only that component of the magnetic field of the one conductor section which is parallel to the capture direction can cause the sensor signal in the one magnetic field sensor, and the other magnetic field sensor may be designed or positioned such that only that component of the magnetic field of the other conductor section which is parallel to the capture direction can cause the sensor signal in the other magnetic field sensor. Further additionally or alternatively, the two magnetic field sensors may have identical spacings from a front side or front of the green area maintenance robot along the robot docking axis.

Further additionally or alternatively, the conductor spacing direction and the sensor spacing direction may be parallel.

In one configuration of the invention, the docking station is designed or configured as a charging station, in particular an electrical charging station. Furthermore, the docking station has at least one station charging connection, in particular an electrical station charging connection. The docking station is designed or configured to be charged, in particular automatically and/or electrically, by the at least one station charging connection. The at least one station charging connection defines the station docking axis.

Additionally or alternatively, the green area maintenance robot is designed or configured as a rechargeable green area maintenance robot, in particular an electrically rechargeable green area maintenance robot. Furthermore, the green area maintenance robot has at least one robot charging connection, in particular an electrical robot charging connection. The green area maintenance robot is designed or configured to be charged, in particular automatically and/or electrically, by the at least one robot charging connection. The at least one robot charging connection defines the robot docking axis.

This makes it possible for the docking station to be able to charge the green area maintenance robot, in particular the docked green area maintenance robot.

In particular, the station charging connection and the robot charging connection can touch for charging. Additionally or alternatively, the station charging connection and/or the robot charging connection may each have or be a charging contact. Further additionally or alternatively, the green area maintenance robot may have a rechargeable battery. The rechargeable battery may be designed to supply a maintenance drive, in particular a lawnmower drive, and/or a motion drive, in particular a travel drive, of the green area maintenance robot. Furthermore, the rechargeable battery may be designed to be charged by the robot charging connection.

In one development of the invention, the two magnetic field sensors each have a capture direction, in particular a vertical capture direction and/or a capture direction orthogonal to the movement plane. Furthermore, the two magnetic field sensors are designed or configured, in particular aligned, such that such that only a component, in particular a vertical component, of the magnetic field that is parallel to the capture direction respectively causes the sensor signal in the magnetic field sensors. Step b) comprises: carrying out control in such a manner that the capture direction of one of the two magnetic field sensors, in particular at the position of the one magnetic field sensor, is orthogonal to the magnetic field and the capture direction of another of the two magnetic field sensors, in particular at the position of the other magnetic field sensor, is not orthogonal, in particular is parallel, to the magnetic field. In particular, this may be or may have been enabled by carrying out control in such a manner that the phase shift may be in the range between 0 and $\pi$, in particular $\pi/2$. Additionally or alternatively, this can enable control in such a manner that the one magnetic field sensor can be positioned above the at least one conductor section in the capture direction and the other magnetic field sensor cannot be positioned above the at least one conductor section in the capture direction. In particular, the capture directions may be parallel to one another. Additionally or alternatively, the two magnetic field sensors may each be designed to capture only that component of the magnetic field which is parallel to the capture direction. Further additionally or alternatively, the one magnetic field sensor may be designed or positioned such that only that component of the magnetic field of the one conductor section which is parallel to the capture direction can cause the sensor signal in the one magnetic field sensor, and the other magnetic field sensor may be designed or positioned such that only that component of the magnetic field of the other conductor section which is parallel to the capture direction can cause the sensor signal in the other magnetic field sensor. Further additionally or alternatively, control may be such that the capture direction of the one magnetic field sensor may be orthogonal to the magnetic field of the one conductor section and the capture direction of the other magnetic field sensor may not be orthogonal to the magnetic field of the other conductor section.

In one development of the invention, the two magnetic field sensors each have a coil, in particular an electrical coil. The two coils are designed or configured in such a manner that the magnetic field respectively causes or induces the sensor signal in the coils. This may make it possible for the two magnetic field sensors to be able to be designed such that only that component of the magnetic field which is parallel to the capture direction can respectively cause the sensor signal in the magnetic field sensors. In particular, the two coils may each be designed to capture the magnetic field.

In one development of the invention, the method has the step of: positioning, in particular automatically positioning, the green area maintenance robot in the region of the magnetic field in such a manner that the magnetic field causes the sensor signal, in particular respectively, in at least one of the two magnetic field sensors, and carrying out step a) and/or step b) after this in terms of time, in particular after the positioning in terms of time. In particular, the positioning may be such that at least one of the two magnetic field sensors can capture the magnetic field. Additionally or alternatively, the positioning can be carried out by means of a further magnetic field of a further electrical conductor arrangement. In particular, the conductor arrangement can be referred to as the docking conductor arrangement and/or the further conductor arrangement can be referred to as the boundary conductor arrangement.

The docking station system according to the invention has a, in particular the, docking station and a, in particular the, electrical conductor arrangement in the region of the docking station. The docking station is designed or configured to dock a, in particular the, autonomous mobile green area maintenance robot. Furthermore, the docking station has a, in particular the, station docking axis. The conductor arrangement has at least two conductor sections, in particular the at least two conductor sections. The two conductor sections each run approximately parallel to the station docking axis. In addition, the two conductor sections have different conductor spacings from the station docking axis, in particular the station central axis, in a, in particular the, conductor spacing direction orthogonal to the station docking axis. The conductor arrangement is designed or configured such that a, in particular the, periodic current flows through the conductor arrangement. The current generates a, in particular the, periodic magnetic field.

The docking station system may enable the same advantages as the method described above.

In particular, the docking station and/or the conductor arrangement may be designed as described above for the method. In particular, the docking station system may have the plate. Additionally or alternatively, the docking station system, in particular the docking station, may have a current source. The current source may be designed to generate the current through the conductor arrangement.

In one development of the invention, the two conductor sections have the different, in particular small, conductor spacings, in particular values of the conductor spacings, from the station docking axis close to the docking station, in particular in the conductor spacing direction. Furthermore, the two conductor sections have identical, in particular large, conductor spacings, in particular values of the conductor spacings, from the station docking axis remote from the docking station, in particular in the conductor spacing direction. This makes it possible for the magnetic field to be able to extend and also act far away from the docking station with the docked green area maintenance robot and to be able to keep a further green area maintenance robot away.

The green area maintenance system according to the invention has a, in particular the, autonomous mobile green area maintenance robot, a determination device, in particular an electrical determination device, and a control device, in particular an electrical control device. The green area maintenance robot is designed or configured to dock, in particular automatically, to a, in particular the, docking station. Furthermore, the green area maintenance robot has two magnetic field sensors, in particular the two magnetic field sensors. The two magnetic field sensors are designed or configured such that a, in particular the, periodic magnetic field respectively causes a, in particular the, periodic sensor signal in the magnetic field sensors. The determination device is designed or configured to determine, in particular automatically, a, in particular the, phase shift between the two sensor signals or signals based on the sensor signals. The control device is designed or configured to control, in particular automatically, movement, in particular the movement, of the green area maintenance robot for docking on the basis of the determined phase shift.

The green area maintenance system may enable the same advantages as the method described above.

In particular, the green area maintenance system may be designed to carry out the method described above. Additionally or alternatively, the green area maintenance robot may be designed as described above for the method. Further additionally or alternatively, the green area maintenance robot may have the determination device and/or the control device.

The system according to the invention has at least one, in particular the, green area maintenance system as described above and at least one, in particular the, docking station system, in particular as described above. The docking station system has a, in particular the, docking station and an, in particular the, electrical conductor arrangement running in the region of the docking station. The docking station is designed or configured to dock the green area maintenance robot. The conductor arrangement is designed or configured such that a, in particular the, periodic current flows through the conductor arrangement. The current generates a, in particular the, periodic magnetic field. In particular, the system may have a plurality of green area maintenance systems and/or a plurality of docking station systems.

BRIEF DESCRIPTION OF THE DRAWINGS

Further advantages and aspects of the invention emerge from the claims and from the following description of preferred exemplary embodiments of the invention which are explained below on the basis of the figures.

DETAILED DESCRIPTION OF THE EXEMPLARY EMBODIMENTS

Figure 1:
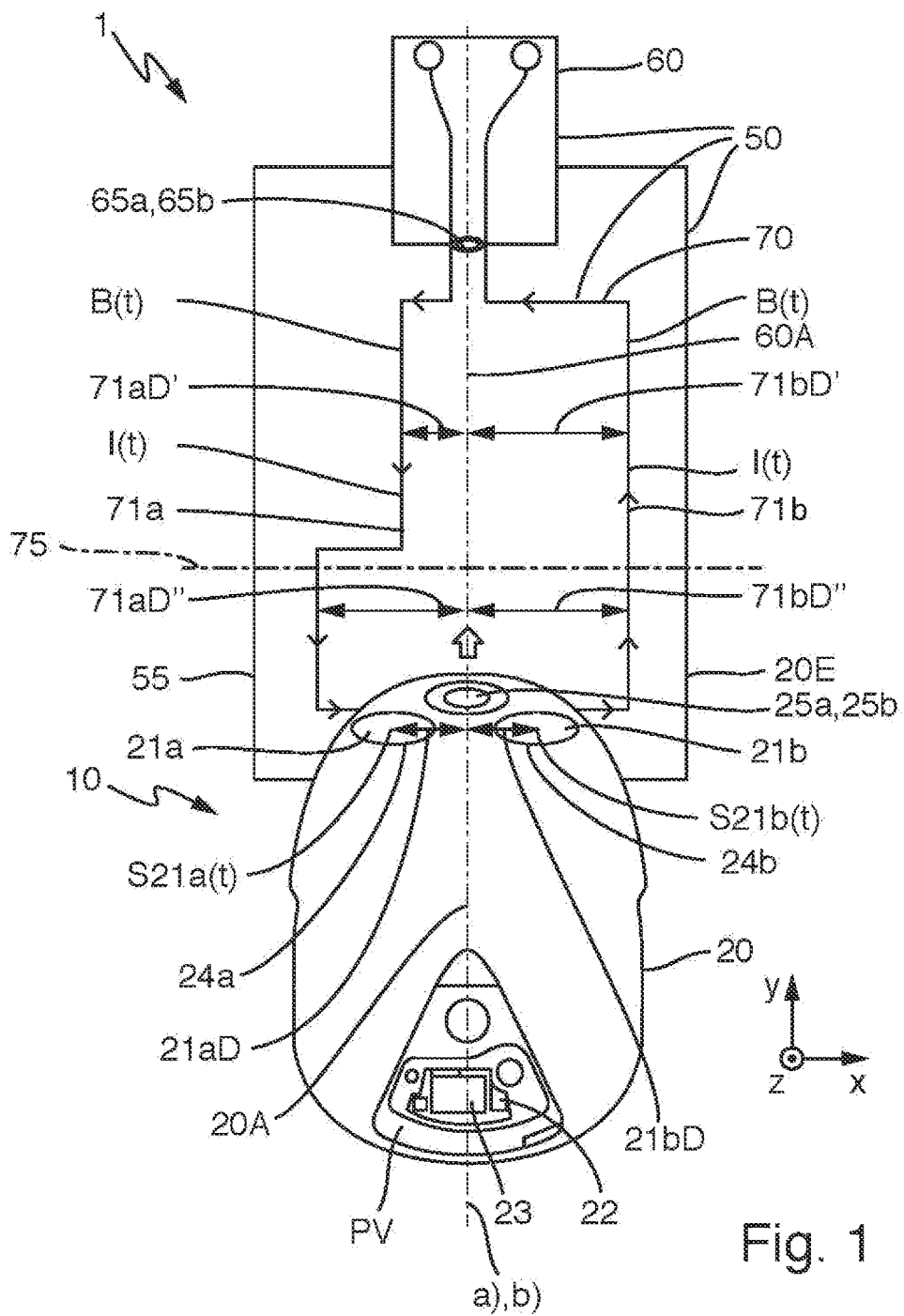
FIG. 1 is a plan view of a system having a docking station system with a docking station and an electrical conductor arrangement and a green area maintenance system with an autonomous mobile green area maintenance robot, a determination device, and a control device, and a method for docking the green area maintenance robot to the docking station.

FIG. 1 illustrates a method designed to dock an autonomous mobile green area maintenance robot 20 to a docking station 60. An electrical conductor arrangement 70 runs in the region of the docking station 60. The conductor arrangement 70 is designed such that a periodic current I(t) flows through the conductor arrangement 70, as shown in FIGS. 1 to 3, 5 and 7. The current I(t) generates a periodic magnetic field B(t). The green area maintenance robot 20 has two magnetic field sensors 21a, 21b. The two magnetic field sensors 21a, 21b are designed such that the magnetic field B(t) respectively causes a periodic sensor signal S21a(t), S21b(t) in the magnetic field sensors 21a, 21b, as shown in FIGS. 4 and 6. The method has the steps of: a) determining a phase shift PV between the two sensor signals S21a(t), S21b(t), as shown in FIG. 8, and b) controlling movement of the green area maintenance robot 20 for docking on the basis of the determined phase shift PV.

The system 1 has at least one green area maintenance system 10 and at least one docking station system 50.

The green area maintenance system 10 has the green area maintenance robot 20, a determination device 22 and a control device 23. The green area maintenance robot 20 is designed to dock to the docking station 60. Furthermore, the green area maintenance robot 20 has the two magnetic field sensors 21a, 21b. The two magnetic field sensors 21a, 21b are designed such that the magnetic field B(t) respectively causes the periodic sensor signal S21a(t), S21b(t) in the magnetic field sensors 21a, 21b. The determination device 22 is designed to determine the phase shift PV between the two sensor signals S21a(t), S21b(t). The control device 23 is designed to control the movement of the green area maintenance robot 20 for docking on the basis of the determined phase shift PV.

In the exemplary embodiment shown, the green area maintenance system 10 is designed to carry out the method. In the exemplary embodiment shown, the green area maintenance robot 20 additionally has the determination device 22 and the control device 23.

The docking station system 50 has the docking station 60 and the electrical conductor arrangement 70 running in the region of the docking station 60. The docking station 60 is designed to dock the green area maintenance robot 20. The conductor arrangement 70 is designed such that the periodic current I(t) flows through the conductor arrangement 70. The current I(t) generates the periodic magnetic field B(t).

In the exemplary embodiment shown, the docking station system 50 has a plate 55. The conductor arrangement 70 is laid in the plate 55.

In detail, the docking station 60 has a station docking axis 60A, in particular a station central axis, in a horizontal direction y in FIG. 1. At least one conductor section 71a, 71b of the conductor arrangement 70 runs approximately parallel to the station docking axis 60A.

In the exemplary embodiment shown, the conductor arrangement 70 has at least two conductor sections 71a, 71b. The two conductor sections 71a, 71b each run approximately parallel to the station docking axis 60A.

Furthermore, the two conductor sections 71a, 71b have different conductor spacings 71aD', 71bD' from the station docking axis 60A in a conductor spacing direction x, a horizontal conductor spacing direction in FIG. 1, orthogonal to the station docking axis 60A.

In detail, the two conductor sections 71a, 71b have the different conductor spacings 71aD', 71bD', the small conductor spacings in the exemplary embodiment shown, from the station docking axis 60A close to the docking station 60. In addition, the two conductor sections 71a, 71b have identical conductor spacings 71aD", 71bD", large conductor spacings in the exemplary embodiment shown, from the station docking axis 60A remote from the docking station 60.

Furthermore, the two conductor sections 71a, 71b have a total conductor spacing 71aD'+71bD' from one another in the conductor spacing direction x orthogonal to the station docking axis 60A, in particular close to the docking station 60.

In the exemplary embodiment shown, the total conductor spacing 71aD'+71bD' is a sum of the different conductor spacings 71aD', 71bD'.

In addition, the green area maintenance robot 20 has a robot docking axis 20A, in particular a robot central axis, in the horizontal direction y in FIG. 1. Step b) comprises: carrying out control in such a manner that the green area maintenance robot 20 moves to the docking station 60 with its robot docking axis 20A aligned approximately coaxially with the station docking axis 60A.

Furthermore, the two magnetic field sensors 21a, 21b have identical sensor spacings 21aD, 21bD from the robot docking axis 20A in a sensor spacing direction x, a horizontal sensor spacing direction in FIG. 1, orthogonal to the robot docking axis 20A.

In addition, the two magnetic field sensors 21a, 21b have a total sensor spacing 21aD+21bD from one another in the sensor spacing direction x orthogonal to the robot docking axis 20A. The total conductor spacing 71aD'+71bD' differs from the total sensor spacing 21aD+21bD and is greater than the total sensor spacing in the exemplary embodiment shown.

In the exemplary embodiment shown, the total sensor spacing 21aD+21bD is a sum of the identical sensor spacings 21aD, 21bD.

Furthermore, the docking station 60 is designed as a charging station. The docking station 60 also has at least one station charging connection 65a, 65b, two station charging connections 65a, 65b in the exemplary embodiment shown. The docking station is designed to be charged by the at least one station charging connection 65a, 65b. The at least one station charging connection 65a, 65b defines the station docking axis 60A.

Furthermore, the green area maintenance robot 20 is designed as a rechargeable green area maintenance robot. The green area maintenance robot 20 also has at least one robot charging connection 25a, 25b, two robot charging connections 25a, 25b in the exemplary embodiment shown. The green area maintenance robot 20 is designed to be charged by the at least one robot charging connection 25a, 25b. The at least one robot charging connection 25a, 25b defines the robot docking axis 20A.

Figure 2:
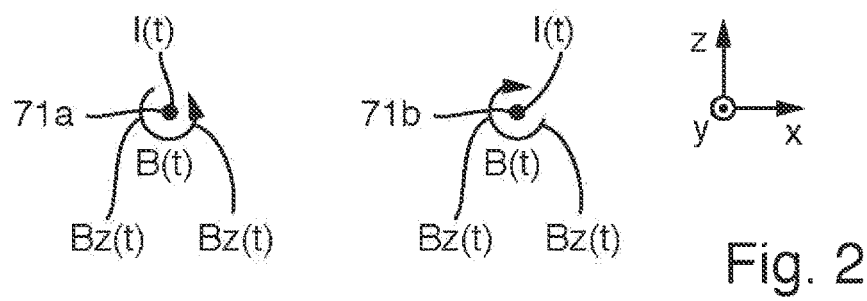
FIG. 2 is a side view of the conductor arrangement from FIG. 1 having at least two conductor sections, through which a periodic current which generates a periodic magnetic field flows.

In the exemplary embodiment shown, the conductor arrangement 70 is a loop, in particular a closed loop. The current I(t) flows away from the docking station 60 through the one conductor section 71a, counter to the horizontal direction y in the exemplary embodiment shown. The current I(t) through the one conductor section 71a generates the magnetic field B(t) with a field line direction, as shown in FIG. 2. The current I(t) flows to the docking station 60 through the other conductor section 71b, in the horizontal direction y in the exemplary embodiment shown. The current I(t) through the other conductor section 71b generates the magnetic field B(t) with an opposite field line direction.

Furthermore, step b) comprises: carrying out control in such a manner that the phase shift PV is in the range between 0 and $\pi$, in particular $\pi/2$, as shown in FIGS. 1 and 8.

In addition, the green area maintenance robot 20 has a movement plane 20E, a horizontal movement plane in FIG. 1.

Furthermore, the two magnetic field sensors 21a, 21b each have a capture direction z, in particular a capture direction approximately orthogonal to the movement plane 20E and/or a vertical capture direction in FIGS. 1 and 2. In addition, the two magnetic field sensors 21a, 21b are designed such that only a component Bz(t) of the magnetic field B(t), a vertical component in FIGS. 1 and 2, which is parallel to the capture direction z respectively causes the sensor signal S21a(t), S21b(t) in the magnetic field sensors 21a, 21b.

In the exemplary embodiment shown, one of the two magnetic field sensors 21a is designed or provided such that only that component Bz(t) of the magnetic field B(t) of the one conductor section 71a which is parallel to the capture direction z causes the sensor signal S21a(t) in the one magnetic field sensor 21a, and another of the two magnetic field sensors 21b is designed or provided such that only that component Bz(t) of the magnetic field B(t) of the other conductor section 71b which is parallel to the capture direction z causes the sensor signal S21b(t) in the other magnetic field sensor 21b.

In addition, step b) comprises: carrying out control in such a manner that the capture direction z of the one magnetic field sensor 21a is orthogonal to the magnetic field B(t), of the one conductor section 71a in the exemplary embodiment shown, and the capture direction z of the other magnetic field sensor 21b is not orthogonal to the magnetic field B(t), of the other conductor section 71b in the exemplary embodiment shown.

Step b) also comprises: carrying out control in such a manner that the one magnetic field sensor 21a is positioned above the at least one conductor section 71a, the one conductor section in the exemplary embodiment shown, in the capture direction z and the other magnetic field sensor 21b is not positioned above the at least one conductor section 71b, the other conductor section in the exemplary embodiment shown, in the capture direction z, in particular wherein the other magnetic field sensor 21b is positioned closer to the other conductor section 71b than the one conductor section 71a.

In addition, the two magnetic field sensors 21a, 21b each have a coil 24a, 24b. The two coils 24a, 24b are designed such that the magnetic field B(t) respectively causes the sensor signal S21a(t), S21b(t) in the coils 24a, 24b.

In the exemplary embodiment shown, the periodic current I(t) has a sinusoidal oscillation. The two sensor signals S21a(t), S21b(t) therefore each have a sinusoidal oscillation, as shown in FIGS. 4 and 6.

Figure 3:
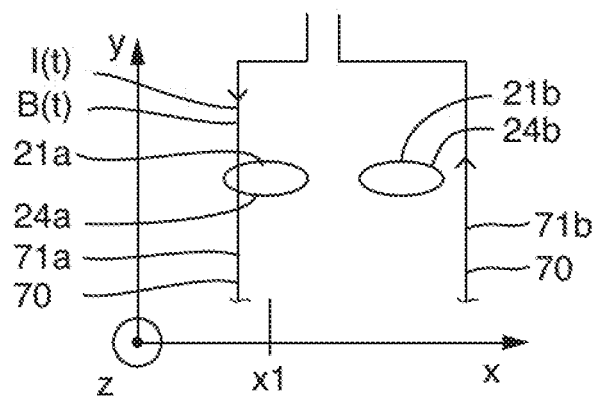
FIG. 3 is a plan view of the conductor arrangement from FIG. 1 and two magnetic field sensors of the green area maintenance robot from FIG. 1.
Figure 4:
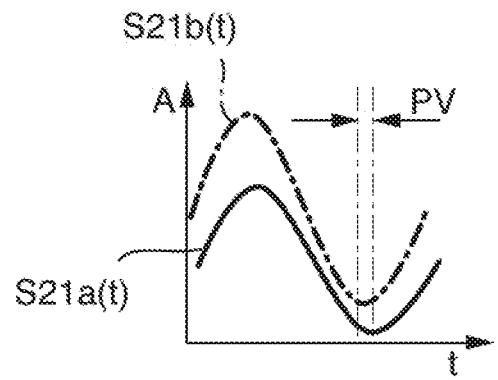
FIG. 4 is a graph of amplitudes of periodic sensor signals from the magnetic field sensors from FIG. 3 over time.

In FIG. 3, the one magnetic field sensor 21a, in particular the one coil 24a, is positioned inside the conductor arrangement 70 in the form of the loop and to the right of the one conductor section 71a. The one magnetic field sensor 21a is therefore not positioned above the one conductor section 71a. The capture direction z of the one magnetic field sensor 21a is therefore not orthogonal to the magnetic field B(t) of the one conductor section 71a. The other magnetic field sensor 21b, in particular the one coil 24b, is positioned inside the conductor arrangement 70 in the form of the loop and to the left of the other conductor section 71b. The other magnetic field sensor 21b is therefore not positioned above the other conductor section 71b. The capture direction z of the other magnetic field sensor 21b is therefore not orthogonal to the magnetic field B(t) of the other conductor section 71b. The sensor signals S21a(t), S21b(t) or their sinusoidal oscillations are therefore in phase, as shown in FIG. 4. The phase shift PV is therefore 0, as shown in FIGS. 4 and 8. The movement of the green area maintenance robot 20 for docking to the left, and in particular upward, in FIG. 3 is therefore controlled and is thus controlled in such a manner that the one magnetic field sensor 21a is positioned above the one conductor section 71a in the capture direction z and the capture direction z of the one magnetic field sensor 21a is therefore orthogonal to the magnetic field B(t) of the one conductor section 71a and the phase shift PV is therefore in the range between 0 and $\pi$, in particular $\pi/2$.

Figure 5:
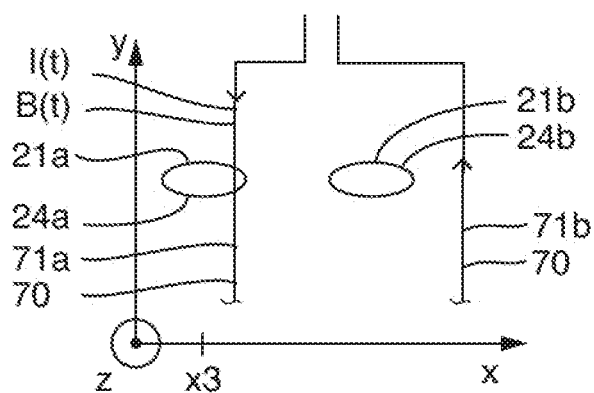
FIG. 5 is a further plan view of the conductor arrangement and the magnetic field sensors from FIG. 1.
Figure 6:
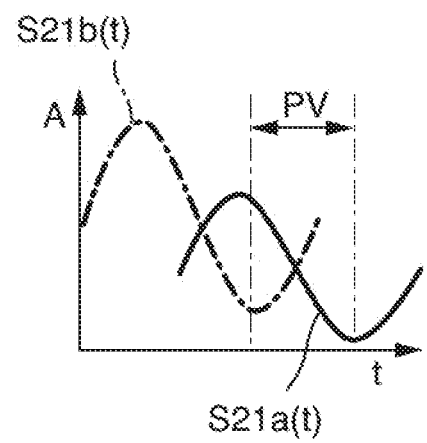
FIG. 6 is a graph of the amplitudes of the sensor signals from the magnetic field sensors from FIG. 5 over time.

In FIG. 5, the one magnetic field sensor 21a, in particular the one coil 24a, is positioned outside the conductor arrangement 70 in the form of the loop and to the left of the one conductor section 71a. The one magnetic field sensor 21a is therefore not positioned above the one conductor section 71a. The capture direction z of the one magnetic field sensor 21a is therefore not orthogonal to the magnetic field B(t) of the one conductor section 71a. The other magnetic field sensor 21b, in particular the one coil 24b, is positioned inside the conductor arrangement 70 in the form of the loop and to the left of the other conductor section 71b. The other magnetic field sensor 21b is therefore not positioned above the other conductor section 71b. The capture direction z of the other magnetic field sensor 21b is therefore not orthogonal to the magnetic field B(t) of the other conductor section 71b. The sensor signals S21a(t), S21b(t) or their sinusoidal oscillations are therefore out of phase, as shown in FIG. 6. The phase shift PV is therefore $\pi$, as shown in FIGS. 6 and 8. The movement of the green area maintenance robot 20 for docking to the right, and in particular upward, in FIG. 5 is therefore controlled and is thus controlled in such a manner that the one magnetic field sensor 21a is positioned above the one conductor section 71a in the capture direction z and the capture direction z of the one magnetic field sensor 21a is therefore orthogonal to the magnetic field B(t) of the one conductor section 71a and the phase shift PV is therefore in the range between 0 and $\pi$, in particular $\pi/2$.

Figure 7:
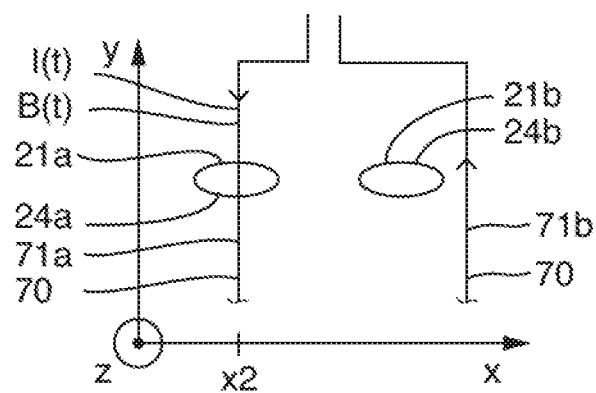
FIG. 7 is a further plan view of the conductor arrangement and the magnetic field sensors from FIG. 1.
Figure 8:
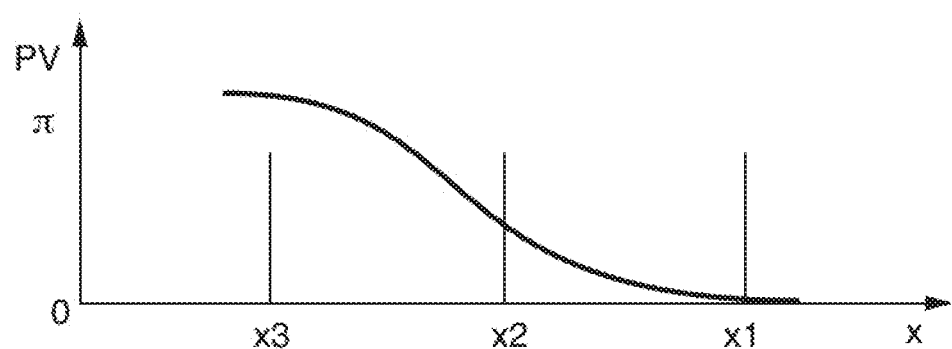
FIG. 8 is a graph of a phase shift between the sensor signals from the magnetic field sensors from FIGS. 3, 5 and 7.

In FIG. 7, the one magnetic field sensor 21a, in particular the one coil 24a, is positioned above the conductor arrangement 70 and above the one conductor section 71a. The capture direction z of the one magnetic field sensor 21a is therefore orthogonal to the magnetic field B(t) of the one conductor section 71a. The other magnetic field sensor 21b, in particular the one coil 24b, is positioned inside the conductor arrangement 70 in the form of the loop and to the left of the other conductor section 71b. The other magnetic field sensor 21b is therefore not positioned above the other conductor section 71b. The capture direction z of the other magnetic field sensor 21b is therefore not orthogonal to the magnetic field B(t) of the other conductor section 71b. The sensor signals S21a(t), S21b(t) or their sinusoidal oscillations therefore change over a diameter of the coil 24a, in particular in the horizontal direction x, between in phase and out of phase. The phase shift PV is therefore in the range between 0 and $\pi$, in particular $\pi/2$, as shown in FIG. 8. The movement of the green area maintenance robot 20 for docking straight ahead and upward in FIG. 7 is therefore controlled and is thus controlled in such a manner that the one magnetic field sensor 21a is or remains positioned above the one conductor section 71a in the capture direction z and the capture direction z of the one magnetic field sensor 21a therefore is or remains orthogonal to the magnetic field B(t) of the one conductor section 71a and the phase shift PV therefore is or remains in the range between 0 and $\pi$, in particular $\pi/2$.

The green area maintenance robot 20 therefore follows the conductor arrangement 70, in particular until docking to the docking station 60.

Furthermore, the method has the step of: positioning the green area maintenance robot 20 in the region of the magnetic field B(t) in such a manner that the magnetic field B(t) causes the sensor signal S21a(t), S21b(t) in at least one of the two magnetic field sensors 21a, 21b, as shown in FIG. 1, and carrying out step a) and/or step b) after this in terms of time.

In the exemplary embodiment shown, the positioning is carried out by means of a further magnetic field of a further electrical conductor arrangement 75, in particular of the system 1, in particular of the docking station system 50.

As is made clear by the exemplary embodiments shown and explained above, the invention provides an advantageous method for docking an autonomous mobile green area maintenance robot to a docking station, which method has improved properties. Furthermore, the invention provides an advantageous docking station system having a docking station, an advantageous green area maintenance system having an autonomous mobile green area maintenance robot and an advantageous system having such a green area maintenance system and a docking station system, in particular such a docking station system.

What is claimed is:

1. A method for docking an autonomous mobile green area maintenance robot to a docking station,
    wherein an electrical conductor arrangement runs in a region of the docking station, wherein the conductor arrangement is designed such that a periodic current flows through the conductor arrangement, wherein the current generates a periodic magnetic field,
    wherein the green area maintenance robot has two magnetic field sensors, wherein the two magnetic field sensors are designed such that the periodic magnetic field respectively causes a periodic sensor signal in the magnetic field sensors,
    wherein the method comprises the steps of:
    a) determining a phase shift between the two sensor signals or signals based on the sensor signals; and
    b) controlling movement of the green area maintenance robot for docking based on the determined phase shift.

2. The method according to claim 1, wherein step b) comprises:
carrying out control such that the phase shift is in a range between 0 and π.

3. The method according to claim 1, wherein
the docking station has a station docking axis, and
at least one conductor section of the conductor arrangement runs approximately parallel to the station docking axis.

4. The method according to claim 3, wherein
the green area maintenance robot has a robot docking axis, and
step b) comprises: carrying out control such that the green area maintenance robot moves to the docking station with its robot docking axis aligned approximately coaxially with the station docking axis.

5. The method according to claim 3, wherein
the green area maintenance robot has a movement plane,
the two magnetic field sensors each have a capture direction approximately orthogonal to the movement plane and are designed such that only a component of the magnetic field that is parallel to the capture direction respectively causes the sensor signal in the magnetic field sensors, and
step b) comprises: carrying out control such that one of the two magnetic field sensors is positioned above the at least one conductor section in the capture direction and another of the two magnetic field sensors is not positioned above the at least one conductor section in the capture direction.

6. The method according to claim 4, wherein
the conductor arrangement has at least two conductor sections, wherein the two conductor sections each run approximately parallel to the station docking axis and have a total conductor spacing from one another in a conductor spacing direction orthogonal to the station docking axis,
the two magnetic field sensors have a total sensor spacing from one another in a sensor spacing direction orthogonal to the robot docking axis, and
the total conductor spacing differs from the total sensor spacing.

7. The method according to claim 3, wherein at least one of:
the conductor arrangement has at least two conductor sections, wherein the two conductor sections each run approximately parallel to the station docking axis and have different conductor spacings from the station docking axis in a conductor spacing direction orthogonal to the station docking axis, and
the two magnetic field sensors have identical sensor spacings from the robot docking axis in a sensor spacing direction orthogonal to the robot docking axis.

8. The method according to claim 3, wherein at least one of:
the docking station is designed as a charging station and has at least one station charging connection, wherein the docking station is designed to be charged by the at least one station charging connection, wherein the at least one station charging connection defines the station docking axis, and
the green area maintenance robot is designed as a rechargeable green area maintenance robot and has at least one robot charging connection, wherein the green area maintenance robot is designed to be charged by the at least one robot charging connection, wherein the at least one robot charging connection defines a robot docking axis.

9. The method according to claim 1, wherein
the two magnetic field sensors each have a capture direction and are designed such that only a component of the magnetic field that is parallel to the capture direction respectively causes the sensor signal in the magnetic field sensors, and
step b) comprises: carrying out control such that the capture direction of one of the two magnetic field sensors is orthogonal to the magnetic field and the capture direction of another of the two magnetic field sensors is not orthogonal to the magnetic field.

10. The method according to claim 1, wherein
the two magnetic field sensors each have a coil, wherein the two coils are designed such that the magnetic field respectively causes the sensor signal in the coils.

11. The method according to claim 1, further comprising:
positioning the green area maintenance robot in the region of the magnetic field such that the magnetic field causes the sensor signal in at least one of the two magnetic field sensors, and
subsequently carrying out step a) and/or step b).

12. A green area maintenance system, comprising:
an autonomous mobile green area maintenance robot, wherein the green area maintenance robot is designed to dock to a docking station and has two magnetic field sensors, wherein the two magnetic field sensors are designed such that a periodic magnetic field respectively causes a periodic sensor signal in the magnetic field sensors;
a determination device, wherein the determination device is designed to determine a phase shift between the two sensor signals or signals based on the sensor signals; and
a control device, wherein the control device is designed to control movement of the green area maintenance robot for docking on the basis of the determined phase shift.

13. A system, comprising:
at least one green area maintenance system according to claim 12;
at least one docking station system, wherein the docking station system has a docking station and an electrical conductor arrangement running in the region of the docking station, wherein the docking station is designed to dock the green area maintenance robot, and wherein the conductor arrangement is designed such that a periodic current flows through the conductor arrangement, wherein the current generates a periodic magnetic field.

14. The system according to claim 13, wherein
the conductor arrangement has at least two conductor sections, wherein the two conductor sections each run approximately parallel to the station docking axis and have different conductor spacings from the station docking axis in a conductor spacing direction orthogonal to the station docking axis, and wherein the conductor arrangement is designed such that a periodic current flows through the conductor arrangement, wherein the current generates a periodic magnetic field.

15. The system according to claim 14, wherein
the two conductor sections have the different conductor spacings from the station docking axis close to the docking station and have identical conductor spacings from the station docking axis remote from the docking station.

\* \* \* \* \*